(12) United States Patent
Fujiwara et al.

(10) Patent No.: US 10,907,257 B2
(45) Date of Patent: Feb. 2, 2021

(54) PROJECTION MATERIAL FOR MECHANICAL PLATING AND HIGH CORROSION-RESISTANT COATING

(71) Applicants: DOWA IP CREATION CO., LTD., Okayama (JP); HONDA MOTOR CO., LTD., Tokyo (JP)

(72) Inventors: Takashi Fujiwara, Okayama (JP); Naohisa Okamoto, Okayama (JP); Kenji Kimura, Okayama (JP); Tsutomu Miyadera, Wako (JP)

(73) Assignees: DOWA IP CREATION CO., LTD., Okayama (JP); HONDA MOTOR CO., LTD., Tokyo (JP)

( * ) Notice: Subject to any disclaimer, the term of this patent is extended or adjusted under 35 U.S.C. 154(b) by 270 days.

(21) Appl. No.: 15/765,700

(22) PCT Filed: Jul. 19, 2016

(86) PCT No.: PCT/JP2016/071126
§ 371 (c)(1),
(2) Date: Apr. 3, 2018

(87) PCT Pub. No.: WO2017/068823
PCT Pub. Date: Apr. 27, 2017

(65) Prior Publication Data
US 2018/0282875 A1 Oct. 4, 2018

(30) Foreign Application Priority Data
Oct. 23, 2015 (JP) .................. 2015-208917

(51) Int. Cl.
| | | |
|---|---|---|
| C22C 18/04 | (2006.01) |
| B22F 1/02 | (2006.01) |
| C23C 24/04 | (2006.01) |
| C22C 38/00 | (2006.01) |
| B22F 1/00 | (2006.01) |
| C23C 2/06 | (2006.01) |
| C23C 2/34 | (2006.01) |
| C22C 18/00 | (2006.01) |

(52) U.S. Cl.
CPC ............... *C23C 24/04* (2013.01); *B22F 1/00* (2013.01); *B22F 1/02* (2013.01); *B22F 1/025* (2013.01); *C22C 18/00* (2013.01); *C22C 18/04* (2013.01); *C22C 38/00* (2013.01); *C23C 2/06* (2013.01); *C23C 2/34* (2013.01); *B22F 2301/35* (2013.01); *B22F 2301/40* (2013.01); *B22F 2303/01* (2013.01); *B22F 2303/30* (2013.01); *B22F 2304/10* (2013.01); *B22F 2304/15* (2013.01); *Y10T 428/12181* (2015.01)

(58) Field of Classification Search
None
See application file for complete search history.

(56) References Cited

U.S. PATENT DOCUMENTS

| | | | | |
|---|---|---|---|---|
| 5,354,579 A | * | 10/1994 | Watanabe | ............... B22F 1/025 427/192 |
| 2006/0263622 A1 | * | 11/2006 | Nagasaki | ............... C23C 24/04 428/570 |

FOREIGN PATENT DOCUMENTS

| | | | |
|---|---|---|---|
| JP | 2001-020050 | * | 1/2001 |
| JP | 2001-279420 A | | 10/2001 |
| JP | 2006-328434 A | | 12/2006 |

* cited by examiner

*Primary Examiner* — Xiaobei Wang
(74) *Attorney, Agent, or Firm* — Oliff PLC

(57) ABSTRACT

In a projection material for mechanical plating, a steel particle is used as a core, and the surrounding surface thereof is coated with a zinc alloy in which the content of Al is more than 5% by mass but equal to or less than 16% by mass, the content of Mg is equal to or more than 5.5% by mass but equal to or less than 15% by mass and the remaining portion is Zn and an impurity, and the content of Fe is equal to or more than 3% by mass but equal to or less than 80% by mass. In this way, the corrosion resistance of a zinc-based coating itself formed in mechanical plating is remarkably enhanced without dependence on protective coating formation treatment such as chromate treatment.

9 Claims, 1 Drawing Sheet

Table 1

| Composition (mass %) | | Example 1 | Example 2 | Example 3 | Example 4 | Example 5 | Comparative example 1 |
|---|---|---|---|---|---|---|---|
| | Al | 10.3 | 9.3 | 5.9 | 12.4 | 8.6 | 3.3 |
| | Mg | 11.1 | 11.1 | 13.0 | 13.3 | 12.9 | 5.9 |
| | Zn | 78.6 | 79.6 | 81.1 | 74.3 | 78.6 | 90.3 |
| 42 cycles | coating thickness | 2.86 | 2.87 | 2.79 | | | 2.83 |
| | Photograph | | | | | | |
| | Evaluation | ○ | ○ | △ | | | × |
| 84 cycles | coating thickness | 2.86 | 2.87 | 2.79 | | | 2.93 |
| | Photograph | | | | | | |
| | Evaluation | ○ | △ | △ | | | × |
| 25 cycles | coating thickness | 3.24 | 3.47 | | 3.05 | 3.32 | 2.70 |
| | Photograph | | | | | | |
| | Evaluation | △ | △ | | ○ | △ | × |

PROJECTION MATERIAL FOR MECHANICAL PLATING AND HIGH CORROSION-RESISTANT COATING

TECHNICAL FIELD

The present invention relates to a projection material for mechanical plating and a high corrosion-resistant coating.

BACKGROUND ART

As a method for improving the corrosion resistance of iron-based metal materials, a method of forming a coating of zinc or a zinc alloy (hereinafter may be referred to as a "zinc-based coating") is widely adopted. As the method of forming the zinc-based coating, technologies such as hot-dip plating, phosphate plating, electroplating and mechanical plating are used industrially and practically.

Among these coating formation methods, in the mechanical plating, the zinc-based coating which is formed has a structure (so-called "piecrust-shape") like a flake-layered structure, and thus when chromate treatment is performed from above the zinc-based coating, a chromate treatment solution sufficiently penetrates the coating, with the result that a remarkable corrosion resistance improvement effect is achieved. For example, when a zinc coating in which a time until red rust occurs in a salt spray test (which refers to a test according to JIS Z2371, the same is true in the following description) is about 24 hours is formed by the mechanical plating, chromate treatment is performed so as to significantly improve the corrosion resistance, and thus the time is dramatically extended to about 3000 hours.

However, regulations on the environment have been recently strengthened, and thus the use of toxic hexavalent chromium tends to be strictly restricted. On the other hand, a treatment method which replaces this treatment and which forms an effective protective coating is not established. The use of a component with the coating formed by the mechanical plating as it is limited in terms of corrosion resistance. Specifically, even by a method using zinc alloy powder whose corrosion resistance is improved, there are limits of the improvement in which in a simple alloy composition of Zn (zinc)-Al (aluminum)-Mg (magnesium), the time until red rust occurs in the salt spray test is extended to about 500 hours and in which even in a composition where special elements such as Na and Be are added, the time is extended to about 1500 hours. In applications for components used outdoors, it is desired to achieve the corrosion resistance in which the time until red rust occurs in the salt spray test is equal to or more than about 1800 hours. In automobile components and the like, it is desired to achieve the corrosion resistance in which the time is equal to or more than 3000 hours in an environment susceptible to salt damage.

RELATED ART DOCUMENT

Patent Document

Patent Document 1: Japanese Unexamined Patent Application Publication No. 2006-328434

DISCLOSURE OF THE INVENTION

Problems to be Solved by the Invention

Hence, an object of the present invention is to provide a projection material which remarkably enhances the corrosion resistance of a zinc-based coating itself formed in mechanical plating without dependence on protective coating formation treatment such as chromate treatment.

Means for Solving the Problem

The present applicant previously proposes, as patent document 1, a projection material for mechanical plating in which a steel particle is used as a core and in which the surrounding surface thereof is coated with a Zn—Al—Mg alloy. In the previous proposal made by the present applicant, it is considered that a significantly dense corrosion product is generated between Zn and Al so as to form a stable sealed coating, that in order to sufficiently achieve such action, the coating needs to contain 1% or more by mass of Al and that even when the added amount exceeds 5% by mass, it is impossible to expect an effect corresponding to the added amount.

However, thereafter, as a result of further research, the present applicant has found that even when the content of Al exceeds 5% by mass, it is possible to obtain excellent corrosion resistance, and thereby constitutes the present invention.

Specifically, in a projection material for mechanical plating (hereinafter may simply be referred to as a "projection material") according to the present invention is a projection material where a steel particle is used as a core, and the surrounding surface thereof is coated with a zinc alloy in which the content of Al is more than 5% by mass but equal to or less than 16% by mass, the content of Mg is equal to or more than 5.5% by mass but equal to or less than 15% by mass and the remaining portion is Zn and an impurity, and in the projection material, the content of Fe is equal to or more than 3% by mass but equal to or less than 80% by mass. An approximate total of the impurity in the zinc alloy up to about 1% by mass may be mixed.

In the configuration described above, the surrounding surface of the steel particle is preferably coated through a Fe—Zn alloy layer with the zinc alloy.

In the configuration described above, the average particle diameter of the projection material is preferably 100 to 600 μm. In the present specification, unless otherwise specified, "to" is used to mean that values mentioned before and after the "to" are included as the lower limit value and the upper limit value.

According to the present invention, a high corrosion-resistant coating is provided in which the projection material described in any one of the configurations mentioned above is made to collide with the surface of a metal material such that the high corrosion-resistant coating is formed on the surface of the metal material, and in which in the high corrosion-resistant coating, the content of Al is more than 5% by mass but equal to or less than 16% by mass, the content of Mg is equal to or more than 5.5% by mass but equal to or less than 15% by mass, the content of Fe is equal to or more than 0.1% by mass but equal to or less than 20% by mass and the remaining portion is Zn and an impurity, and the thickness thereof is equal to or more than 2 μm but equal to or less than 15 μm.

Advantages of the Invention

According to the projection material of the present invention, it is possible to remarkably enhance the corrosion resistance of a zinc alloy coating itself formed in mechanical plating without dependence on protective coating formation treatment such as chromate treatment.

The coating according to the present invention is used so as to obtain a sufficient corrosion resistance effect even when its thickness is so thin as to be equal to or less than 15 μm or about 2 to 5 μm, and thus it is possible to provide high corrosion resistance to components, such as "screws", to which hot-dip plating requiring a large thickness cannot be applied. Hence, for example, a component for an outdoor structure in which an expensive stainless steel is inevitably used is replaced with a component having the coating of the present invention, with the result that it is possible to obtain a large cost reduction effect.

BRIEF DESCRIPTION OF THE DRAWING

The FIGURE is Table 1, reporting results of Examples 1-5 and Comparative Example 1.

DESCRIPTION OF EMBODIMENTS (Zinc Alloy)

One of the major features of the present invention is that a zinc alloy with which the outer circumference of a steel particle is coated has a Zn—Al—Mg composition. In a coating formed by mechanical plating, a significantly dense corrosion product is generated between Zn and Al so as to form a stable sealed coating. It has been so far assumed that in order to sufficiently achieve such action, the content of Al in the coating formed is set equal to or less than 5% by mass. However, as a result of a thorough examination made by the present inventors, et al., it is found that even when the content of Al exceeds 5% by mass, it is possible to obtain corrosion resistance. Although the upper limit value for the content of Al is specified to be 16% by mass in the present application as a result of experimental results which will be described later, even when the content of Al exceeds the upper limit value, it may be possible to obtain satisfactory corrosion resistance.

Since the composition of the zinc alloy with which the outer circumference of the steel particle is coated is substantially reflected on the composition of a coating which is formed on the surface of an item to be treated that is formed of a metal material, in the present invention, the content of Al in the zinc alloy of a projection material is specified to be more than 5% by mass but equal to or less than 16% by mass.

In the coating formed by the mechanical plating, Mg forms an oxide or a hydroxide. The oxide and the hydroxide of Mg have high electrical insulation so as to reduce a corrosion current when Zn in the coating is corroded. The oxide and the hydroxide of Mg prevent the permeation of oxygen so as to show protection action against the corrosion of Zn. Although Mg is lower in potential than Zn, Mg produces a stable corrosion product under a corrosive environment and reduces the galvanic action of Zn. It is considered that in this way, the elution of Zn in the coating is reduced, and that thus an anticorrosive effect is enhanced. It is found from the detailed examination made by the present inventors, et al. that when the content of Mg in the coating is set equal to or more than 5.5% by mass, the effects of Mg described above become obvious. Furthermore, when a Mg concentration of 7% or more by mass is realized, in combination with an effect of the collision of the projection material having a core of the steel particle, an extremely remarkable corrosion resistance improvement effect beyond a case where chromate treatment is performed is achieved.

However, since Mg is easily oxidized in the molten metal of a Zn alloy, when the content of Mg is increased, it is difficult to manufacture a projection material by use of the molten metal of a Zn alloy which will be described later. Hence, the content of Mg in the coating needs to be set equal to or less than 15% by mass. More preferably, the content of Mg falls within a range of 7 to 13% by mass.

In the coating obtained by the mechanical plating, Fe derived from the projection material and components is normally contained. When the content of Fe in the coating falls within a range of 0.1 to 20% by mass, satisfactory results are obtained. The total of impurity elements other than Zn, Al, Mg and Fe is preferably reduced to 1% or less by mass.

(Steel Particle)

As the steel particle used in the present invention, the particle of an iron alloy containing 0.3 to 2% of carbon is used, and in addition to carbon, metal elements such as N (nitrogen), Si (silicon), Mn (manganese), Cr (chromium) and Ni (nickel) may be added.

Although the shape of the steel particle is not particularly limited, the steel particle preferably has a spherical shape. In such a case, in 95% or more by mass of all the particles, the particle diameter of the steel particle preferably falls within a range of 10 to 800 μm, and the average particle diameter preferably falls within a range of 100 to 600 μm, particularly preferably falls within a range of 100 to 400 μm and more preferably falls within a range of 150 to 300 μm. The hardness of the steel particle preferably falls within a range of 200 to 700 Hv. As the steel particle, for example, a commercial steel shot can be used.

The particle diameter of the particle (after the alloy coating) forming the projection material preferably falls within a range of 10 to 800 μm as described above. The average particle diameter thereof preferably falls within a range of 100 to 600 μm and in particular, can be set to fall within a range of 100 to 400 μm or a range of 150 to 300 μm. The content of Fe in the particle of the projection material preferably falls within a range of about 3 to 80% by mass.

(Projection Material)

The projection material of the present invention is obtained by coating the outer circumference of the steel particle with the zinc alloy. Although the projection material described above is made to collide with the surface of the item to be treated formed of the metal material, and thus a conventionally known effect of enhancing the adherence of the coating is obtained, when an adherent substance is set to have a composition of Al—Mg composite addition which has a high content of Al and a high content of Mg, the corrosion resistance is also dramatically enhanced. This is a phenomenon which is not conventionally predicted. It is considered that the projection material having the steel particle as the core is made to collide therewith, that thus the coating is firmly adhered to an underlying metal and the coating itself is more strengthened and that consequently, resistance to the damage of the coating is enhanced. It is estimated that the sealing action caused by Al in the adherent substance and the elution prevention action of Zn caused by increasing the content of Mg are combined together, and that consequently, the significant corrosion resistance enhancement effect is achieved.

In order to sufficiently achieve the effect specific to the present invention as described above, it is preferable to control a ratio between the amount of steel particle serving as the core and the amount of zinc alloy layer (adherent substance) coating the surrounding surface thereof such that the content of Fe in the projection material falls within a range of 3 to 80% by mass. When the content of Fe drops below the range, it is difficult to obtain sufficient projection energy whereas when the content of Fe exceeds the range, the amount of adherent substance is relatively lowered, and thus the life of the projection material at the time of blast treatment where the mechanical plating is performed is inefficiently finished in an early stage.

A thickness of at least 2 μm needs to be acquired for the coating formed on the surface of the item to be treated. However, it is not economical to acquire a thickness exceeding 15 μm by the mechanical plating. The thickness of the coating is normally controlled to fall within a range of about 2 to 15 μm, and thus it is possible to obtain a remarkable corrosion resistance improvement effect.

(Method of Manufacturing Projection Material)

The steel particles serving as the cores are put into the molten metal of the zinc alloy which has a composition corresponding to the adherent substance and are agitated, and are removed when they are brought into a semi-solid state as the temperature of the molten metal is lowered. Thereafter, the projection material of the present invention is manufactured by performing grinding and sieving. Here, the amounts of molten metal of the zinc alloy and steel particles which are put thereinto are preferably controlled such that the content of Fe in the particle of the projection material falls within a range of 3 to 80% by mass. By the method described above, the outer circumference of the steel particle is coated with the zinc alloy, and thus a Fe—Zn alloy layer is formed around the interface therebetween. Since the Fe—Zn alloy layer is relatively fragile, when the projection material collides with the surface of the item to be treated at the time of blast treatment, the fine particles of the zinc alloy which are finely sheared in the portions of the Fe—Zn alloy layers are adhered by pressure to the surface of the item to be treated, with the result that the uniformity of the coating is enhanced.

EXAMPLES

Although the present invention will be described in more detail below using examples, the present invention is not limited at all to these examples.

Example 1

50 kg of the molten metal of a zinc alloy having a composition of Zn—Al (13.3% by mass)-Mg (11.1% by mass) and less than 1% by mass of other impurities was held at 610° C. so as to be uniformalized, thereafter a burner which was burned in order to hold it at 610° C. was turned off and immediately thereafter 65 kg of steel shots serving as steel particles was put into the molten metal while being agitated. The steel shot used was a commercial product having an average particle diameter of 260 μm and an average hardness of 412 Hv. When the molten metal was brought into a semi-solid state as the temperature thereof was lowered, a mixture of the zinc alloy and the steel shots was removed and was transferred to a crusher before being completely solidified, and crushing was started. Then, the crushing was continued until the individual steel shots were separated and the shape of the surface thereof was substantially spherical, with the result that a projection material was obtained.

The average particle diameter of the projection material was 240 μm. The cross section of the particle of the projection material was observed with an SEM (scanning electron microscope), and consequently, it was found that the particle of the projection material had, in the center portion, the core of the steel particle derived from the steel shot and had, on the surrounding surface thereof, a zinc alloy coating layer through an alloy layer formed by the reaction of the steel shot and the molten metal. Furthermore, when the cross section was analyzed, it was found that the alloy layer formed by the reaction of the steel shot and the molten metal was a Fe—Zn alloy layer and that the zinc alloy coating layer forming the surrounding surface had a composition reflecting a substantially initial molten metal composition as it was. The sample of the projection material was subjected to composition analysis using JIS M8212-1958 (Method for determination of total iron in iron ore and potassium permanganate titration capacity method), and consequently, it was found that the content of Fe in the projection material was 51.4% by mass.

This projection material was used so as to form, with a mechanical plating device, a zinc alloy coating on the surface of a commercial 4T bolt (made of steel). The conditions of the projection were set such that the projection amount was 60 kg/min, the velocity of projection particles which was the initial velocity was about 51 m/sec and the projection time was 80 min. The cross section of the bolt after the formation of the coating was observed with an X-ray fluorescence spectrometer, and consequently, it was found that the thickness of the coating was about 2.86 The composition of the coating formed was examined, and consequently, it was found that the content of Al was about 5.6% by mass, the content of Mg was about 8.7% by mass, the content of Fe was about 0.4% by mass and the remaining portion was substantially Zn. The total amount of elements (impurities) other than those described above was less than 1% by mass. A combined cycle test was performed on the 4T bolt on which the coating of the zinc alloy thus obtained was formed. In the combined cycle test, one cycle of wetting (40° C., 95% RH, 2 hours)→salt spraying (35° C., concentration of 5 wt % NaCl+5 wt % CaCl$_2$, 2 hours)→drying (60° C., 1 hour)→wetting (50° C., 95% RH, 6 hours)→drying (60° C., 2 hours)→wetting (50° C., 95% RH, 6 hours)→drying (60° C., 2 hours)→low temperature or air-cooled drying (−20° C. or room temperature, 3 hours) was set, and a predetermined number of cycles were repeated.

As an item to be treated, instead of the bolt, a cold rolled steel sheet (SPCC) having a plate thickness of 0.8 mm was used, the mechanical plating was performed on the surface thereof under the same conditions so as to form a coating having a thickness of about 3.24 μm and thereafter the combined cycle test was performed. The results of the test are shown in table 1.

Example 2

The same operation as in example 1 was performed except that a zinc alloy having a composition of Zn—Al (9.3% by mass)-Mg (11.1% by mass) and less than 1% by mass of other impurities was used, and thus a projection material having an average particle diameter of 265 μm was obtained. The cross section of the particle of the projection material was observed by X-ray fluorescence analysis, and consequently, it was found that the particle of the projection material had, in the center portion, the core of the steel particle derived from the steel shot and had, on the surrounding surface thereof, a zinc alloy coating layer through an alloy layer formed by the reaction of the steel shot and the molten metal. Furthermore, when the cross section was analyzed, it was found that the alloy layer formed by the reaction of the steel shot and the molten metal was a Fe—Zn alloy layer and that the zinc alloy coating layer forming the surrounding surface had a composition reflecting a substantially initial molten metal composition as it was. The sample of the projection material was subjected to composition analysis using JIS M8212-1958 (Method for determination of total iron in iron ore and potassium permanganate titration capacity method), and consequently, it was found that the content of Fe in the projection material was 48.6% by mass.

This projection material was used, as in example 1, the mechanical plating was performed on the surfaces of the 4T bolt (made of steel) and the cold rolled steel sheet so as to form a zinc alloy coating and the combined cycle test was performed. The thickness of the coating on the 4T bolt was 2.87 µm, and the thickness of the coating on the cold rolled steel sheet was 3.47 µm. The results of the test are shown in table 1.

Example 3

The same operation as in example 1 was performed except that a zinc alloy having a composition of Zn—Al (5.9% by mass)-Mg (13.0% by mass) and less than 1% by mass of other impurities was used, and thus a projection material having an average particle diameter of 230 µm was obtained. The cross section of the particle of the projection material was observed by X-ray fluorescence analysis, and consequently, it was found that the particle of the projection material had, in the center portion, the core of the steel particle derived from the steel shot and had, on the surrounding surface thereof, a zinc alloy coating layer through an alloy layer formed by the reaction of the steel shot and the molten metal. Furthermore, when the cross section was analyzed, it was found that the alloy layer formed by the reaction of the steel shot and the molten metal was a Fe—Zn alloy layer and that the zinc alloy coating layer forming the surrounding surface had a composition reflecting a substantially initial molten metal composition as it was. The sample of the projection material was subjected to composition analysis using JIS M8212-1958 (Method for determination of total iron in iron ore and potassium permanganate titration capacity method), and consequently, it was found that the content of Fe in the projection material was 46.5% by mass.

This projection material was used, as in example 1, the mechanical plating was performed on the surface of the 4T bolt (made of steel) so as to form a zinc alloy coating and the combined cycle test was performed. The thickness of the coating on the 4T bolt was 2.79 µm. The results of the test are shown in table 1.

Example 4

The same operation as in example 1 was performed except that a zinc alloy having a composition of Zn—Al (12.4% by mass)-Mg (13.3% by mass) and less than 1% by mass of other impurities was used and that the holding temperature for 50 kg of the molten metal of the zinc alloy was set to 570° C., and thus a projection material having an average particle diameter of 260 µm was obtained. The cross section of the particle of the projection material was observed by X-ray fluorescence analysis, and consequently, it was found that the particle of the projection material had, in the center portion, the core of the steel particle derived from the steel shot and had, on the surrounding surface thereof, a zinc alloy coating layer through an alloy layer formed by the reaction of the steel shot and the molten metal. Furthermore, when the cross section was analyzed, it was found that the alloy layer formed by the reaction of the steel shot and the molten metal was a Fe—Zn alloy layer and that the zinc alloy coating layer forming the surrounding surface had a composition reflecting a substantially initial molten metal composition as it was. The sample of the projection material was subjected to composition analysis using JIS M8212-1958 (Method for determination of total iron in iron ore and potassium permanganate titration capacity method), and consequently, it was found that the content of Fe in the projection material was 48.0% by mass.

This projection material was used, as in example 1, the mechanical plating was performed on the surface of the cold rolled steel sheet so as to form a zinc alloy coating and the combined cycle test was performed. The thickness of the coating on the cold rolled steel sheet was 3.05 µm. The results of the test are shown in table 1.

Example 5

The same operation as in example 1 was performed except that a zinc alloy having a composition of Zn—Al (8.6% by mass)-Mg (12.9% by mass) and less than 1% by mass of other impurities was used and that the holding temperature for 50 kg of the molten metal of the zinc alloy was set to 580° C., and thus a projection material having an average particle diameter of 265 µm was obtained. The cross section of the particle of the projection material was observed by X-ray fluorescence analysis, and consequently, it was found that the particle of the projection material had, in the center portion, the core of the steel particle derived from the steel shot and had, on the surrounding surface thereof, a zinc alloy coating layer through an alloy layer formed by the reaction of the steel shot and the molten metal. Furthermore, when the cross section was analyzed, it was found that the alloy layer formed by the reaction of the steel shot and the molten metal was a Fe—Zn alloy layer and that the zinc alloy coating layer forming the surrounding surface had a composition reflecting a substantially initial molten metal composition as it was. The sample of the projection material was subjected to composition analysis using JIS M8212-1958 (Method for determination of total iron in iron ore and potassium permanganate titration capacity method), and consequently, it was found that the content of Fe in the projection material was 46.5% by mass.

This projection material was used, as in example 1, the mechanical plating was performed on the surface of the cold rolled steel sheet so as to form a zinc alloy coating and the combined cycle test was performed. The thickness of the coating on the cold rolled steel sheet was 3.32 µm. The results of the test are shown in table 1.

Comparative Example 1

The same operation as in example 1 was performed except that a zinc alloy having a composition of Zn—Al (3.3% by mass)-Mg (5.9% by mass) and less than 1% by mass of other impurities was used and that the holding temperature for 50 kg of the molten metal of the zinc alloy was set to 550° C., and thus a projection material having an average particle diameter of 240 µm was obtained. The cross section of the particle of the projection material was observed by X-ray fluorescence analysis, and consequently, it was found that the particle of the projection material had, in the center portion, the core of the steel particle derived from the steel shot and had, on the surrounding surface thereof, a zinc alloy coating layer through an alloy layer formed by the reaction of the steel shot and the molten metal. Furthermore, when the cross section was analyzed, it was found that the alloy layer formed by the reaction of the steel shot and the molten metal was a Fe—Zn alloy layer and that the zinc alloy coating layer forming the surrounding surface had a composition reflecting a substantially initial molten metal composition as it was. The sample of the projection material was subjected to composition analysis using JIS M8212-1958 (Method for determination of total iron in iron ore and potassium permanganate titration capacity method), and consequently, it was found that the content of Fe in the projection material was 59.7% by mass.

This projection material was used, as in example 1, the mechanical plating was performed on the surfaces of the 4T bolt (made of steel) and the cold rolled steel sheet so as to form a zinc alloy coating and the combined cycle test was performed. The thickness of the coating on the 4T bolt was 2.83 μm, and the thickness of the coating on the cold rolled steel sheet was 2.70 μm. The results of the test are shown in table 1.

(Combined Cycle Test)

The combined cycle test described above was performed on the 4T bolts and the cold rolled steel sheets which were obtained. The state of the occurrence of red rust was visually observed after the completion of 42 cycles and 54 cycles for the 4T bolts and after the completion of 25 cycles for the cold rolled steel sheets, and evaluations were performed with the following criteria. In table 1, the photograms of the states of the bolts and the cold rolled steel sheets are shown.

"O": No red rust
"Δ": Red rust over 1 to 50% of the whole
"x": Red rust over more than 50% of the whole As is understood from table 1, on the 4T bolts and the cold rolled steel sheets on which the coatings were formed by the mechanical plating with the projection materials according to the present invention, as a result of the combined cycle test, the occurrence of red rust was significantly reduced.

On the other hand, on the 4T bolts and the cold rolled steel sheet in comparative example 1 on which the coating was formed with the projection material having the low content of Al, as a result of the combined cycle test, in 42 cycles, red rust already occurred on most of the 4T bolts. Even on the cold rolled steel sheet, in 25 cycles, red rust occurred.

Example 6

The same operation as in example 1 was performed except that a zinc alloy having a composition of Zn—Al (15.0% by mass)-Mg (10.4% by mass) and less than 1% by mass of other impurities was used and that the holding temperature for 50 kg of the molten metal of the zinc alloy was set to 610° C., and thus a projection material having an average particle diameter of 215 μm was obtained. The cross section of the particle of the projection material was observed by X-ray fluorescence analysis, and consequently, it was found that the particle of the projection material had, in the center portion, the core of the steel particle derived from the steel shot and had, on the surrounding surface thereof, a zinc alloy coating layer through an alloy layer formed by the reaction of the steel shot and the molten metal. Furthermore, when the cross section was analyzed, it was found that the alloy layer formed by the reaction of the steel shot and the molten metal was a Fe—Zn alloy layer and that the zinc alloy coating layer forming the surrounding surface had a composition reflecting a substantially initial molten metal composition as it was. The sample of the projection material was subjected to composition analysis using JIS M8212-1958 (Method for determination of total iron in iron ore and potassium permanganate titration capacity method), and consequently, it was found that the content of Fe in the projection material was 55.7% by mass.

This projection material was used so as to form, with the mechanical plating device, a zinc alloy coating on the surface of an item to be treated which was made of steel and which was annular. The conditions of the projection were set such that the projection amount was 60 kg/min, the velocity of projection particles which was the initial velocity was about 51 m/sec and the projection time was 80 min. The cross section of the item to be treated after the formation of the coating was observed with the X-ray fluorescence spectrometer, and consequently, it was found that the thickness of the coating was about 2.5 μm. A cycle test was performed on the item to be treated on which the coating of the zinc alloy thus obtained was formed. In the cycle test, one cycle of salt spraying (35° C., concentration of 5 wt % NaCl, 2 hours)→drying (60° C., 25% RH, 4 hours)→wetting (50° C., 100% RH, 4 hours) was set, and the number of cycles until red rust occurred on the item to be treated was counted. The results of the test are shown in Table 2.

Example 7

The projection material of example 6 was used, and the same operation as in example 6 was performed except that the projection time was set to 100 min so as to form a zinc alloy coating on the surface of the item to be treated. The thickness of the coating was about 2.9 μm. Then, the same cycle test as in example 6 was performed on the item to be treated on which the coating of the zinc alloy thus obtained was formed. The results of the test are shown in Table 2.

Comparative Example 2

The projection material of comparative example 1 was used, and the same operation as in example 6 was performed so as to form a zinc alloy coating on the surface of the item to be treated. The thickness of the coating was about 2.3 μm. Then, the same cycle test as in example 6 was performed on the item to be treated on which the coating of the zinc alloy thus obtained was formed. The results of the test are shown in Table 2.

Comparative Example 3

The projection material of comparative example 1 was used, and the same operation as in example 6 was performed except that the projection time was set to 120 min so as to form a zinc alloy coating on the surface of the item to be treated. The thickness of the coating was about 3.0 μm. Then, the same cycle test as in example 6 was performed on the item to be treated on which the coating of the zinc alloy thus obtained was formed. The results of the test are shown in Table 2.

TABLE 2

|  |  | Example 6 | Example 7 | Comparative example 2 | Comparative example 3 |
| --- | --- | --- | --- | --- | --- |
| Composition (mass %) | Al | 15.0 | 15.0 | 3.3 | 3.3 |
|  | Mg | 10.4 | 10.4 | 5.9 | 5.9 |
|  | Zn | 74.6 | 74.6 | 90.8 | 90.8 |
| Coating thickness (μm) |  | 2.5 | 2.9 | 2.3 | 3.0 |
| Number of cycles |  | 75 | 84 | 21 | 36 |

As is clear from table 2, in examples 6 and 7, the projection material was used in which the zinc alloy coating layer where the content of Al was 15.0% by mass was formed, the coatings having thicknesses of 2.5 μm and 2.9 μm were formed on the items to be treated by the mechanical plating and the numbers of cycles until rust occurred on the items to be treated were respectively 75 cycles and 84 cycles.

By contrast, in comparative examples 2 and 3, the projection material was used in which the zinc alloy coating layer where the content of Al was 3.3% by mass was formed, and the coatings having thicknesses of 2.3 μm and 3.0 μm, which were substantially the same as in examples 6 and 7, were formed on the items to be treated by the mechanical plating. In comparative examples 2 and 3, the numbers of cycles until rust occurred on the items to be treated were respectively 21 cycles and 36 cycles, and as compared with examples 6 and 7, in one half or less of the number of cycles, rust occurred.

INDUSTRIAL APPLICABILITY

According to the projection material of the present invention, it is possible to remarkably enhance the corrosion resistance of a zinc alloy coating itself formed in mechanical plating without dependence on protective coating formation treatment such as chromate treatment, and thus the projection material is useful.

The invention claimed is:

1. A projection material for mechanical plating, wherein the projection material is comprised of a plurality of coated steel particles,
wherein each coated steel particle is comprised of a steel particle as a core, and having a coating thereover of a zinc alloy consisting of a content of Al that is equal to or more than 5.9% by mass but equal to or less than 16% by mass, a content of Mg that is equal to or more than 5.5% by mass but equal to or less than 15% by mass, and a remaining portion that is Zn and one or more impurities, and
wherein in the projection material, a content of Fe is equal to or more than 3% by mass but equal to or less than 80% by mass.

2. The projection material for mechanical plating according to claim 1,
wherein an interface layer is formed between the steel core and the zinc alloy coating and comprises a Fe—Zn alloy.

3. The projection material for mechanical plating according to claim 1,
wherein an average particle diameter of the coated steel particles is 100 to 600 μm.

4. The projection material for mechanical plating according to claim 2,
wherein an average particle diameter of the coated steel particles is 100 to 600 μm.

5. A method of forming a coating on a surface of a metal material,
comprising colliding the projection material according to claim 1 with the surface of the metal material so as to form the coating on the surface of the metal material.

6. A method of forming a coating on a surface of a metal material,
comprising colliding the projection material according to claim 2 with the surface of the metal material so as to form the coating on the surface of the metal material.

7. A method of forming a coating on a surface of a metal material,
comprising colliding the projection material according to claim 3 with the surface of the metal material so as to form the coating on the surface of the metal material.

8. A method of forming a coating on a surface of a metal material,
comprising colliding wherein the projection material according to claim 4 with the surface of the metal material so as to form the coating on the surface of the metal material.

9. The projection material for mechanical plating according to claim 1,
wherein in the composition of the zinc-alloy coating, a content of Al is equal to or more than 8.6% by mass but equal to or less than 16% by mass.

* * * * *